Dec. 30, 1969   M. PÄÄBO   3,486,955
METHOD AND APPARATUS FOR HEAT SEALING AND CUTTING POROUS
THERMOPLASTIC MATERIAL
Filed May 2, 1966
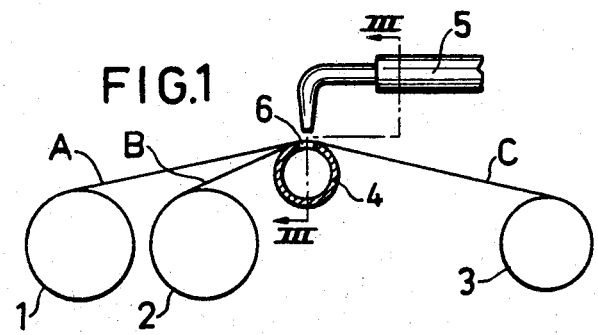
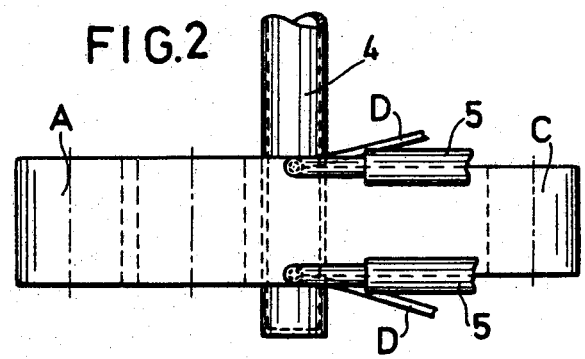
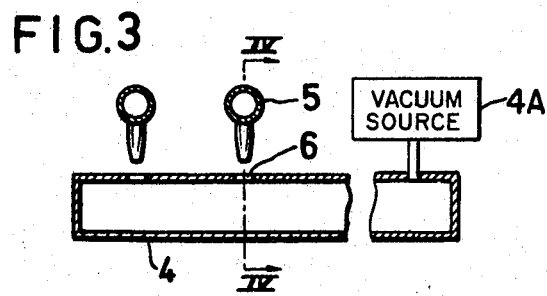
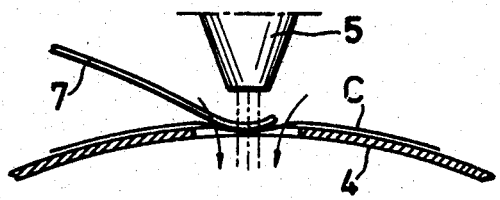
INVENTOR.
Max Pääbo
BY Sommers+Young
Attorneys United States Patent Office 3,486,955
Patented Dec. 30, 1969

3,486,955
METHOD AND APPARATUS FOR HEAT SEALING AND CUTTING POROUS THERMOPLASTIC MATERIAL
Max Pääbo, Norrkoping, Sweden, assignor to Aktiebolaget Maxbo, Norrkoping, Sweden, a Swedish joint-stock company
Filed May 2, 1966, Ser. No. 546,783
Claims priority, application Sweden, May 6, 1965, 5,940/65
Int. Cl. B32b 31/26
U.S. Cl. 156—82        7 Claims

ABSTRACT OF THE DISCLOSURE

Apparatus and method for heat sealing or cutting thermoplastic material in which the material is moved relative to a supporting surface having an aperture therein, one or more jets of a heating medium are applied to the material at the location of an aperture in the supporting surface, and a suction is applied to the opposite side of the supporting surface to draw away the gases, to cool the supporting surface, and to cool the heated material.

---

This invention relates to a method of heat sealing or cutting porous thermoplastic material, for example a fabric of this material, and to an arrangement for carrying out the method.

It is previously known to effect heat sealing or cutting of thermoplastic material by a thermal jet or the like from a nozzle which is directed against a material web, or in the case of sealing against two webs passing below the jet. The web or webs are supported on a carrier over which they are advanced. During the heat sealing the said support is heated which affects the sealing in a disadvantageous manner. If, besides, the machine stops for some reason, the material is destroyed by burning, because the thermal jet from the nozzle is directed to the same point for a longer period.

The disadvantages of the conventional methods and machines are eliminated by the present invention in that the method and the arrangement for carrying out the method are given the characterizing features as they are defined in the claims.

The invention subject matter is described in the following with reference to the drawings showing an embodiment of the invention.

FIG. 1 shows a side view, partly in section, of the heat sealing of two webs of a thermoplastic material, FIG. 2 shows a horizontal view of the arrangement in FIG. 1, FIG. 3 shows a section along the line III—III in FIG. 1, FIG. 4 shows on an enlarged scale a partial section through one of the openings with above mounted nozzle substantially along the line IV—IV in FIG. 3.

As appears from FIGS. 1 and 2, the arrangement for heat sealing comprises two webs A and B of a thermoplastic material, two rollers 1 and 2 from which the material is rolled off, and a roller 3 on which the web C united by heat sealing is rolled on, which roll 3 is driven for effecting the feed of the webs. For pressing the webs together, they are directed angularly towards and over a carrier or support member 4 which may have the shape of a plate, a rod or the like. Above the said support one or a plurality of nozzles 5 are mounted which spray a jet, for example of hot air, against the webs, thereby causing the thermoplastic material to melt and the webs to unite. In the embodiment shown, the heat sealing occurs in two places of the web, in such a manner, that the united web forms a "stocking" which later on can be filled with material for packing purposes. Such a method can be applied, for example, in the production of teabags, in which case the webs are of fine-meshed nylon netting.

FIG. 2 shows how the surplus material D in the webs, which at the sealing was cut from the united web, after the nozzles deflects outwardly from the web.

So far, the arrangement described is in agreement with the conventional arrangements. The latter, however, involve several serious shortcomings. There is, at first, the unpleasant smell which arises by the heat sealing. This smell spoils the air in the machine room and deteriorates the comfort of the machine operator. The greatest disadvantage, however, is to be seen in the heating of the support member 4 by the thermal jet from the nozzle 5, as a result of which the support is subjected to temperature variations during the operation of the machine, as the jet all the time is directed to the same point or area on the support. Due to this heating, the molten material sticks on the support 4, and the web or webs are unavoidably burnt off under the jet when the machine stops for one reason or another.

According to the invention, the support 4 is designed as a hollow stationary member, for example a tube, to which a vacuum source 4A, for example a fan or the like, is connected. The said means effects a vacuum in the tube and thereby the removal by suction of air flowing in through openings 6 disposed in the tube immediately below the nozzles 5, and also of the gases developed by the heat sealing. By this arrangement, thus, the gases are sucked off and, besides, the air flowing down in the openings cools the melt in the web immediately subsequent to the heat sealing or cutting. By this cooling the melt is stabilized rapidly. When the machine stops for some reason or must be stopped, the suction produces a state of continuation preventing the material from being burnt. Upon the starting of the machine the work can continue from the same point where it was interrupted.

FIG. 4 shows on an enlarged scale how the air represented by the arrows passes through the porous web material to the side of the hot jets from the nozzles, which are indicated by dash-dotted lines. As an additional advantage of the openings 6 in the support 4, a finger 7, for example in the form of a curved thread or the like, can be arranged to allow the hot jet to pass and to press down the webs into the opening, thereby additionally assisting and ensuring that the webs are pressed together under the hot jet.

What I claim is:

1. A method for heat sealing and cutting a plurality of webs of porous thermoplastic material comprising the steps of,
    supporting said material on a supporting member having at least one aperture therein,
    directing at least one heating jet toward said aperture through the intervening material,
    moving said material and said jet relative to each other and heat sealing and cutting said webs while maintaining said jet directed at said aperture,
    and applying a suction to the side of said supporting member opposite that which is in juxtaposition with said material to thereby cool said supporting member and also cool the melted area of said material and also carry away the gases resulting from heating of the material.

2. The method of claim 1 in which said material is urged into said aperture at least adjacent the region where said jet is directed onto said material.

3. The method of claim 1 in which said material is continually moved over said supporting member and said jet is stationary relative to said supporting member.

4. The method of claim 1 in which said supporting member has a convex shape and said material is guided over said member in a direction transverse to the axis of the curved surface in such manner as to contact said supporting surface substantially only at the location of said aperture.

5. Apparatus for the heat sealing and cutting of a plurality of webs of porous thermoplastic material comprising in combination, a supporting member having an aperture therein, means for moving said material over said supporting member, means for directing at least one jet of a heating medium onto said material at the location of said aperture, and means for producing a vacuum at the side of said supporting member opposite that which bears against said material for drawing air through said aperture to thereby cool said supporting member and said material.

6. The apparatus of claim 5 in which said supporting member is a hollow rod.

7. The apparatus of claim 5 wherein at least one support finger supported adjacent said aperture in said supporting member urges said material into said aperture of said supporting member to thereby press together the webs in the immediate vicinity of the jet.

References Cited

UNITED STATES PATENTS

| | | | |
|---|---|---|---|
| 3,322,584 | 5/1967 | Welin-Berger | 156—497 XR |
| 3,202,561 | 8/1965 | Swanson et al. | 161—44 |
| 3,057,766 | 10/1962 | Dickey | 156—82 |
| 3,210,227 | 10/1965 | Shichman | 156—82 |

PHILIP DIER, Primary Examiner

U.S. Cl. X.R.

156—251, 285, 497, 498, 515